May 5, 1942.                C. GRANT                2,281,763
                        CARD PRINTING MACHINE
                        Filed April 27, 1940           2 Sheets-Sheet 1
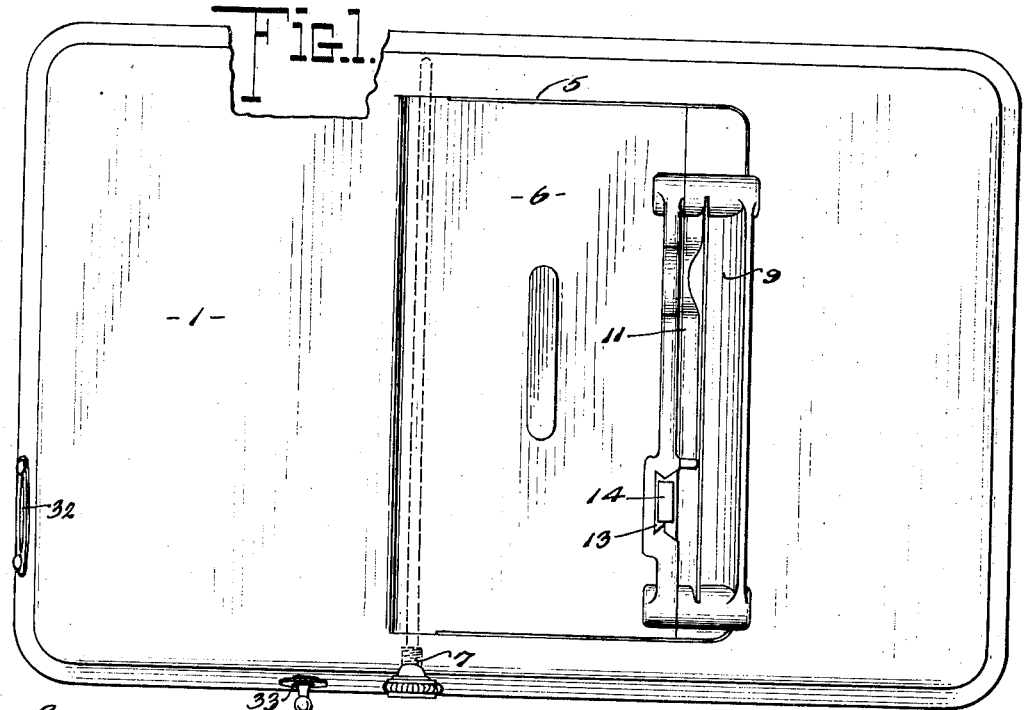
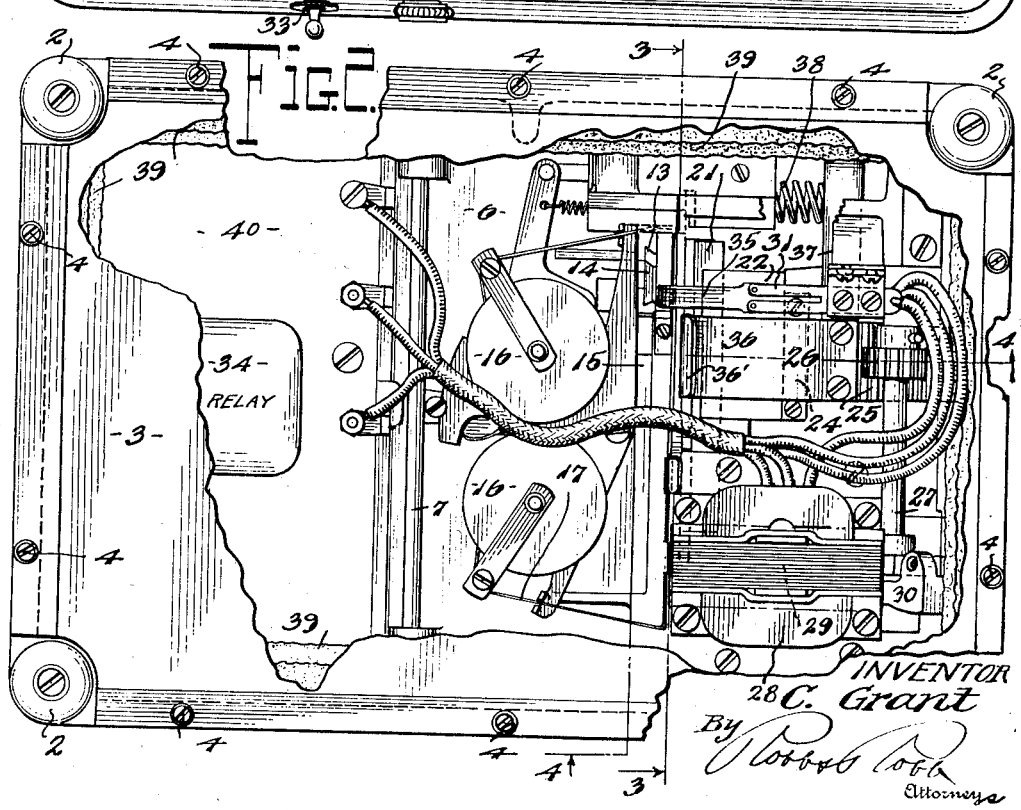

May 5, 1942.                    C. GRANT                    2,281,763
                          CARD PRINTING MACHINE
                          Filed April 27, 1940                2 Sheets-Sheet 2
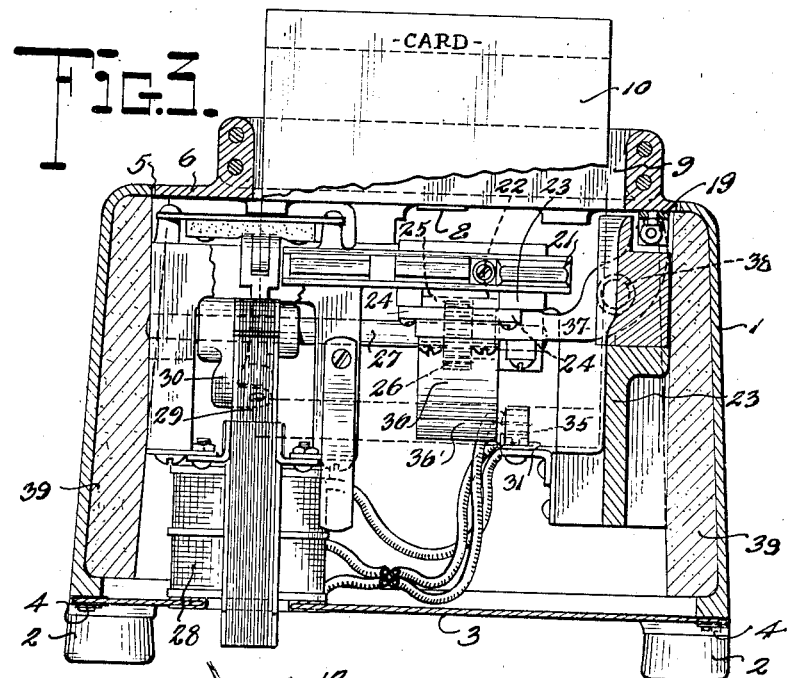
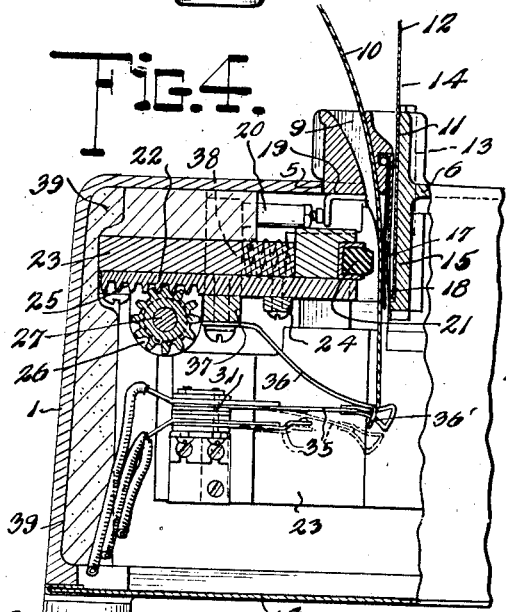
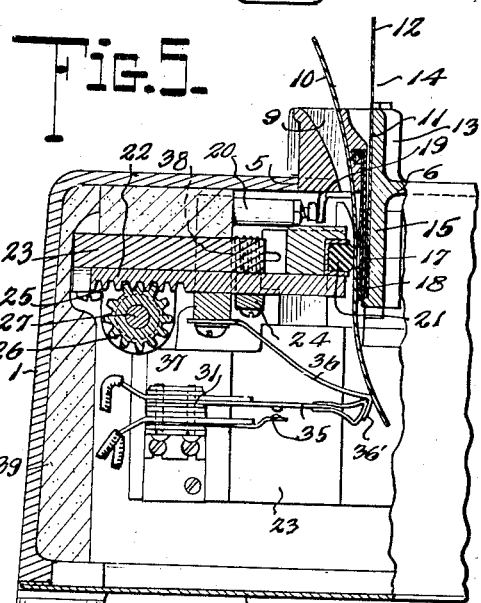
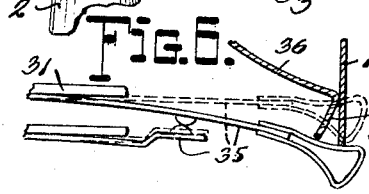
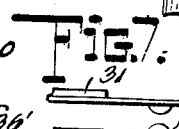
Inventor
C. Grant
By Robert Cobb
Attorneys Patented May 5, 1942

UNITED STATES PATENT OFFICE 2,281,763

CARD PRINTING MACHINE

Chester Grant, Syracuse, N. Y., assignor to Gaylord Bros., Inc., Syracuse, N. Y., a corporation of New York Application April 27, 1940, Serial No. 332,059

7 Claims. (Cl. 101—287)

This invention relates to printing or stamping machines, and more particularly to machines for printing or stamping office records in a form convenient for use in airport or airline ticket offices and similar places.

In recent years, travel by air has rapidly increased and this is due to no small measure to special discounts which are allowed to passengers for extensive travel by air over a predetermined period. Where one has qualified for a special discount, as by depositing a predetermined sum of money with one of the airlines, it has been customary for the airline to issue to that patron a discount card bearing a serial number or other suitable identification which will be recognized by all of the airlines which are embodied in the large group which have agreed to make this service available to their patrons. When after issuance of a discount card, the holder thereof desires to obtain a ticket for a particular trip, he presents his discount card at the ticket office and the ticket agent fills out certain office records, several of which are customarily required, entering upon the office records the identification data appearing on the discount card. This, of course, takes time, which is oftentimes unsatisfactory both to the airline as well as to the patron, especially where the transportation arrangements are made at practically the last minute before plane departure time. Moreover, the element of human error in filling out the office records frequently results in mistakes which may prove confusing and embarrassing, as where the wrong account is charged with the ticket purchase because of an error in the entry of the identification number on the office record form.

With the foregoing in mind, it is one of the primary objects of the present invention to provide a simple and inexpensive machine which is capable of expeditiously and accurately printing or stamping such information as may be required upon a suitable card or other office record form, and minimizing certain common faults usually attributed to the human element.

In carrying out the aforementioned object, my invention contemplates the provision of a type carrier of any convenient form, such as a card, having one or more type plates affixed thereto which may or may not be readily removable, and which are provided with raised type indicia preferably including code letters identifying the particular airline issuing the same, a serial number identifying the patron to whom the card is to be issued, and/or an account number, this card to be retained by the patron for presentation to the ticket agent whenever a ticket is to be purchased or charged against the patron's account.

The machine to which this invention particularly relates preferably comprises a guide into which a record card or other office form, of either the single or manifold type, may be inserted to automatically cause a printing or stamping impression to be made thereon through means of the so-called type card previously mentioned, which is also insertable in the machine to occupy a position such that it will make the printing or stamping impression when the record card or form is inserted.

A further object of the invention is to provide a machine of the character above described and embodying a movable platen which is automatically controlled by the record card or form to cause the platen to move into cooperative printing relation to the insertable type card when the record card is interposed between the platen and the type card, and which platen is automatically controlled to positively move out of printing relation respecting the type card and record card when the printing or stamping impression has been completed.

Another object of the invention is to provide cooperative printing elements between which a record card or form may be inserted and removed, one of which printing elements is movable towards and away from an operative printing position, and is automatically actuated by means of a simple, efficient, and positively acting type, controlled by the record card or form.

More specifically, my invention contemplates the provision of a movable platen automatically controlled by a record card or form to produce a printing or stamping impression on the record card or form incident to positioning of the latter between the platen and a cooperative relatively stationary printing element or elements, together with means actuatable by the platen to displace the record card or form relative to the card-controlled actuating means so that the movable platen will be automatically restored to its normal non-printing position following its printing operation.

A still further object of the invention is to provide a machine of the character referred to in the preceding paragraph, wherein the platen control means includes electromagnetic means and a switch operable by the record card or form to energize the same to produce a printing movement of the platen, together with abutment means carried by the platen for displacing the record card or form to further operate the switch to deenergize the electromagnetic means and thereby automatically restore the platen to its non-printing position.

Other and further objects and advantages of the invention will be hereinafter described and the novel features thereof defined by the appended claims.

In the drawings:

Figure 1 is a top plan view of a machine constructed in accordance with one embodiment of my invention;

Figure 2 is a bottom plan view of the machine with a portion of the bottom closure broken away to expose certain of the operating parts and controls;

Figure 3 is a vertical transverse sectional view taken approximately on the line 3—3 of Figure 2;

Figure 4 is a fragmentary view of a portion of the machine, and principally showing a section on the line 4—4 of Figure 2, with the record card or form positioned to receive a printing or stamping impression, but with the operating parts and controls shown in other positions prior to commencement of the printing operation;

Figure 5 is a view generally similar to Figure 4, showing the record card or form displaced relative to the card-controlled means and the cooperative printing elements in their positions assumed in the act of producing the printing or stamping impression upon the record card or form;

Figure 6 is an enlarged fragmentary detail view showing the normal open position of the card-controlled switch in dotted lines, and also showing in full lines the closed position of the switch, as produced by the card which is shown in section, with the card displacing means also shown in section and positioned relative to the record card or form preparatory to the commencement of the card displacing action, and Figure 7 is a view generally similar to Figure 6 with the record card or form shown displaced by the displacing means relative to the card-controlled switch, and with the switch restored to its normal open position.

Like reference characters designate corresponding parts in the several figures of the drawings which are to be considered simply as one illustrative embodiment of my invention. In other words, the drawings and following description are not to be taken as limiting the invention to the particular adaptation for airport or airline use excepting as defined in the appended claims, since other adaptations embodying the same fundamental or basic principles will readily become apparent to those skilled in the art.

According to the illustrated embodiment of the invention, 1 generally denotes a casing or housing, hereinafter referred to as a casing, which may be constructed from any suitable material, preferably metal, to have the desired form and size capable of enclosing the operating mechanisms of the machine. The casing is preferably provided at its lower corners with resilient pads or cushions 2 to prevent the same from marring or scratching a surface on which the machine is to be supported. The lower side of the casing is normally closed by a detachable closure plate 3 having one or more removable fasteners or screws 4 extending therethrough into the lower edges of the casing. The upper side of the casing 1 is provided with an opening 5 which is normally closed by a cover 6. This cover is preferably detachably mounted on the casing, as by providing a transverse pintle 7 which extends through the opposite sides of the casing 1 near the top of the casing, and also extends through the cover 6 near one edge of the latter, as clearly shown in Figure 1. The pintle 7 may have threaded engagement with one of the side walls of the casing 1, so that it will be normally restrained against displacement, while permitting the same to be conveniently removed to permit the cover 6 to be disconnected from the casing. The edge of the cover 6 opposite to that through which the pintle 7 extends is provided with a stop 8 projecting therefrom and engageable beneath the corresponding edge of the opening 5 in the upper side of the casing 1 so as to prevent swinging movement of the cover 6 about the pintle 7 when the cover is positioned on the casing across the opening 5 and attached to the casing by the pintle. To remove the cover, it is necessary to withdraw the pintle 7, thereby allowing the cover to be lifted off of the casing and exposing the opening 5 to afford free access to the interior of the casing.

Carried by the cover 6, and extending upwardly from the upper side thereof, is a slot or guide 9, hereinafter referred to as a card guide, the same being adapted to receive a record card or form which is to be printed or stamped. The record card is generally designated 10, and may have the form of a single card or sheet, or a plurality of cards or sheets of the manifold type. If the latter type is used, the cards will have carbons or other duplicating surfaces therebetween so that a printing or stamping impression upon the outermost card of the group will be reproduced by the duplicating sheets or surfaces upon all of the cards or sheets Behind the card guide 9 is another guide 11 for receiving a type card 12 carrying one or more type plates provided with suitably raised letters, numbers, or other indicia or combinations thereof. The type card 12 is preferably of less width than the record card 10, and the guide 11 is formed to have a size corresponding therewith, and is disposed towards one side of the record card guide 9. Another guide 13 is provided on the cover 6 adjacent to the type card guide 11, and in this guide 13 is preferably mounted a date bar 14 having a plurality of type plates arranged thereon one above the other, these latter type plates also having raised indicia representing dates or other periods of time. The date bar 14 is adjustable vertically in its guide 13 to selectively position the type plates carried thereby in horizontal alinement with the type plate on the type card 12, when the latter is inserted in its guide 11 to the printing position shown in Figures 4 and 5. It will be understood that the type indicia on both the type card 12 and the date bar 14 lie in the same transverse plane so that they will simultaneously print upon or stamp the record card 10 when the record card is inserted in its guide 9 and moved to an operative printing position.

Depending from the lower side of the cover 6 is a flange or wall 15 having recesses therein coextensive with the guides 11 and 13 and constituting continuations of these guides. Also mounted upon the lower side of the cover 6 is a pair of spools 16, 16, on which is wound an inking ribbon 17. The ribbon is arranged to extend across the face of the wall 15 and across the guides therein, in register with the printing positions of the type plates carried by the respective type card 12 and date bar 14, as shown in Figures 2, 4 and 5. A relatively thin sheet metal plate 18 is also mounted on the cover 6 so as to lie in front of the wall 15 and over the inking ribbon 17, this thin plate being provided with suitable apertures registering with the type plates so that the type indicia may produce a printing impression through these openings upon the record card 10, when the record card is inserted in its guide 9 and moved downwardly to a printing position in front of the thin metal plate 18, inking ribbon 17, and type plates, as best shown in Figures 4 and 5. The inking ribbon 17 is intermittently fed from one spool 16 to the other spool in any suitable manner, the details of which are immaterial to the present invention. For the sake of brevity, it may be mentioned that the feeding of the inking ribbon is controlled by reciprocation of an actuator bar 19 mounted for sliding movement on the lower side of the cover 6, and having its forward end disposed to be engaged by an actuator 20 which is power-controlled in a manner hereinafter to be described.

Mounted within the casing 1 is a plane generally designated 21, and positioned in horizontal alinement with the type plates on the type card 12 and date bar 14 when the latter are in their printing positions. The printing or stamping impression is made upon the record card 10 by moving the platen 21 against the record card to force the same into printing relation to the inking ribbon 17 and the cooperative printing elements hereinbefore described. Normally, the platen is positioned as shown in Figure 4, corresponding to the non-printing position, with the platen spaced from the cooperative printing elements so that the record card 10 may be freely inserted and removed from between the platen and the cooperative printing elements. The printing position of the platen is shown in Figure 5. Operation of the platen may be obtained in any suitable manner, as by means of the mechanism and controls now to be described. The platen 21 is carried by a reciprocal bar 22 slidably mounted in a frame generally designated 23, which frame is suitably attached to the casing 1. A guide bar 24 extends across the lower side of the platen bar 22 and is connected with the frame 23 to restrain the platen bar from displacement from the frame. The lower side of the platen bar 22 is provided with a rack 25 which meshes with a pinion 26 fixed on a rock shaft 27. By rotating the rock shaft 27 in one direction, the plate 21 is moved toward the cooperative printing elements to produce the printing or stamping action, whereas rotation of the rock shaft 27 in the opposite direction restores the platen to its non-printing position. Operation of the rock shaft is preferably obtained by electromagnetic means of the solenoid and plunger type. The solenoid is generally designated 28, and is arranged with its hollow core in a vertical position to receive the plunger 29 which is movable in an upward and downward direction therein. The upper end of the plunger 29 is suitably connected to a crank arm 30 fixed on the rock shaft 27, as shown in Figure 3. Energization and deenergization of the solenoid 28 is controlled by a switch generally designated 31, the same being arranged in a suitable electrical circuit which may be conveniently attached to any available electrical outlet through means of an extension cord engageable with the connector 32 mounted at one end of the casing 1. A switch 33 is preferably interposed in the circuit so that the circuit may be broken at any time when the machine is not to be used. If desired, a relay 34 of any appropriate type may be incorporated in the electrical circuit to reduce the load on the switch 31. Since these circuit details will be perfectly obvious to those skilled in the art, further description of the same is unnecessary.

Switch 31, which controls the energization and deenergization of the solenoid 28, is illustrated as a normally open switch having one of its resilient contact arms 35 extended for engagement at its free end by the record card 10, so that the same may be depressed by the record card to the dotted line position shown in Figure 4, or to the full line position shown in Figure 6. When so depressed, the switch contacts will be closed, thereby energizing the solenoid 28, which, in turn, pulls down the plunger 29 and actuates the rock shaft 27 in one direction, causing the movable platen 21 to be actuated to its printing position shown in Figure 5. Mounted upon the platen bar 22, so as to be movable therewith and with the platen 21, is an abutment member 36 which may be of any suitable construction. As shown, the abutment member 36 has the form of a relatively stiff but somewhat resilient plate, the free end of which is turned downwardly at 36' to provide an abutment surface of substantial area engageable with the record card 10 at one side of the extended switch arm 35. Thus, as the platen 21 approaches its printing position, the abutment member 36 strikes the lower end of the record card 10 and displaces the latter to a position out of engagement with the switch arm 35, as shown in Figure 7, thereby allowing the switch arm 35 to spring back to its normal position shown in dotted lines in Figure 6, with the switch contacts open. This displacement of the card 10 may take place at about the instant the printing impression is made upon the card, or just prior thereto. In the later case, the inertia of the platen 21 will be sufficient to complete the printing stroke.

Also fixed to the platen bar 22 for movement therewith is an arm 37 which extends laterally therefrom, and carries at its free end the member 20 which serves to operate the ribbon feed actuator bar 19, hereinbefore referred to. Upon completion of the printing stroke of the platen 21, the platen may be returned automatically by means of a spring 38 which is so arranged as to normally urge the platen bar 22 to the position shown in Figure 4. Such a spring is illustrated in Figure 2, being interposed between the arm 37 and one side of the frame 23 in which the platen bar is slidably mounted. It is to be understood, of course, that the invention is not limited to the precise arrangement of the return spring as just described, since various modifications may be made in an obvious manner. The feature of primary importance is the automatic displacement of the record card 10 from engagement with the switch arm 35 so as to positively assure deenergization of the solenoid 28 at the proper time in the printing operation.

In order to reduce noise in the operation of the machine, the casing 1 may be lined interiorly with felt, or any other suitable sound-absorbing material, as indicated at 39 in the various figures of the drawings. Also, for convenience in wiring, the electrical circuit, the casing 1 may be provided with a wiring panel 40 of insulating material, such as Bakelite, and having suitable terminals mounted thereon for connection with the conductors of the circuit. The wiring panel 40 is best shown in Figure 2, and occupies a horizontal position near the upper wall of the casing 1 to which the panel may be conveniently connected. When employing a relay, such as is indicated at 34, the relay may also be conveniently mounted upon the wiring panel.

The operation of the machine will be obvious from the foregoing description, and may be briefly summarized as follows: After insertion of the type card 12 in its guide 11, so that it occupies a position as shown in Figures 4 and 5, and then adjusting the date bar 14 to the proper position which presents a selected one of the type plates thereon for printing the date, which adjustment of the date bar may be effected by a rotatable operating member (not shown) extended laterally through the side of the casing 1 and operatively engaging the date bar, as by means of a rack and pinion, the record card 10 is then inserted in the guide 9 and moved downwardly until it strikes and depresses the switch arm 35, closing the switch contacts. This energizes the relay 29 and actuates the movable platen 21 to cause a printing or stamping impression to be made upon the record card. As the stamping impression is made, the abutment member 36 strikes the lower end of the record card 10 and displaces the same from engagement with the switch arm 35, allowing the switch 31 to open, thereby energizing the solenoid 28 and causing the platen 21 to be restored to its non-printing position. Thereupon, the record card 10 may be removed from the machine which is now conditioned for a subsequent printing operation upon another record card.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In apparatus of the class described, cooperative printing elements between which a card or the like is adapted to be inserted, one of said printing elements being movable towards and away from the cooperating printing element in producing a printing impression upon an inserted card, means controlled by the card for actuating said movable printing element, and card flexing means actuated by the movable printing element during the printing operation for flexing a portion of said card to a position ineffective to maintain the printing action of the movable printing element through the card-controlled means.

2. In apparatus of the class described, cooperative printing elements between which a card or the like is adapted to be inserted, one of said printing elements being movable towards and away from the cooperating printing element in producing a printing impression upon an inserted card, guide means for guiding the card to a fixed printing position between the printing elements and for restraining the portion of the card in the printing zone against substantial displacement transversely to the plane of the card, means controlled by the card for actuating said movable printing element, and means actuated by the movable printing element during the printing operation for transversely displacing the integral actuating means-controlling portion of the card to a non-actuating position relative to the card-controlled means while the card is in its printing position, to thereby render said card ineffective to maintain the printing action of the movable printing element through the card-controlled means.

3. In apparatus of the class described, cooperative printing elements between which a card or the like is adapted to be inserted, one of said printing elements being movable towards and away from the cooperating printing element in producing a printing impression upon an inserted card, means controlled by the card for actuating said movable printing element, and card flexing means carried by and movable with the movable printing element during the printing operation for flexing said card to render it ineffective to maintain the printing action of the movable printing element through the card-controlled means.

4. In apparatus of the class described, cooperative printing elements between which a card or the like is adapted to be inserted, one of said printing elements being movable towards and away from the cooperating printing element in producing a printing impression upon an inserted card, guide means for guiding the card to a fixed printing position between the printing elements and for restraining the portion of the card in the printing zone against substantial displacement transversely to the plane of the card, electrically-operable means for actuating said movable printing element and including a switch controlled by a portion of the card outside of the printing zone, and abutment means movable with the movable printing element during the printing operation and engageable with the card to transversely displace the integral portion of the card which controls the switch to a position ineffective to maintain the printing operation of the card-controlled switch, while the card remains in its printing position aforesaid.

5. Apparatus as claimed in claim 4, wherein the abutment means comprises a relatively stiff spring member having an abutment surface disposed for engagement with the card in the zone of the card-controlled switch.

6. In apparatus of the class described, cooperative printing elements between which a card or the like is adapted to be inserted, one of said printing elements being movable towards and away from the cooperating printing element in producing a printing impression upon an inserted card, guide means for guiding the card to a fixed printing position between the printing elements and for restraining the portion of the card in the printing zone against substantial displacement transversely to the plane of the card, electrically-operable means for actuating said movable printing element, a switch operatively connected with the electrically-operable means, said switch having a yieldable arm engageable by an integral portion of the card outside of the zone between the printing elements to actuate the same, and abutment means movable with the movable printing element during the printing operation and engageable with the integral portion of the card aforesaid to transversely displace the same from engagement with the switch arm to a position ineffective to maintain the printing operation of the card-controlled switch.

7. In apparatus of the class described, cooperative printing elements between which a card or the like is adapted to be inserted, one of said printing elements being movable towards and away from the cooperating printing element in producing a printing impression upon an inserted card, electrically-operable means for actuating said movable printing element, a switch operatively connected with the electrically-operable means, said switch having a yieldable arm depressible by a portion of the card outside of the zone between the printing elements on insertion of the card between the printing elements to energize the electrically-operable means, and abutment means movable with the movable printing element during the printing operation and engageable with the switch arm depressing portion of the inserted card to deflect the same from engagement with the switch arm to deenergize the electrically-operable means.

CHESTER GRANT.